US012241770B2

(12) United States Patent
Gawade

(10) Patent No.: US 12,241,770 B2
(45) Date of Patent: Mar. 4, 2025

(54) DEVICE AND SYSTEM FOR DETERMINING WATER LEVEL AND ASSESSING WATER CONSUMPTION AT A BOREWELL

(71) Applicant: Vijay Dattatray Gawade, Pune (IN)

(72) Inventor: Vijay Dattatray Gawade, Pune (IN)

( * ) Notice: Subject to any disclaimer, the term of this patent is extended or adjusted under 35 U.S.C. 154(b) by 257 days.

(21) Appl. No.: 17/802,311

(22) PCT Filed: Feb. 24, 2021

(86) PCT No.: PCT/IB2021/051541
§ 371 (c)(1),
(2) Date: Aug. 25, 2022

(87) PCT Pub. No.: WO2021/171193
PCT Pub. Date: Sep. 2, 2021

(65) Prior Publication Data
US 2023/0098756 A1 Mar. 30, 2023

(30) Foreign Application Priority Data
Feb. 27, 2020 (IN) .............................. 202021008422

(51) Int. Cl.
*G01F 23/296* (2022.01)
*G01F 1/05* (2006.01)
*G01F 15/06* (2022.01)

(52) U.S. Cl.
CPC .............. *G01F 23/296* (2013.01); *G01F 1/05* (2013.01); *G01F 15/06* (2013.01)

(58) Field of Classification Search
None
See application file for complete search history.

(56) References Cited

U.S. PATENT DOCUMENTS

2014/0009302 A1* 1/2014 Singer ................ G01F 23/2966
340/853.1

* cited by examiner

*Primary Examiner* — Peter J MacChiarolo
*Assistant Examiner* — Jermaine L Jenkins
(74) *Attorney, Agent, or Firm* — Emerson Thomson Bennett; Daniel A. Thomson

(57) ABSTRACT

The present disclosure provides a device for determining water level and assessing water consumption at a borewell. The device includes: a tapping mechanism coupled to a top metal cover of the borewell, configured to generate a first sound wave; a sound detector coupled to the top metal cover of the borewell, configured to detect a second sound wave associated with reflection of the first sound wave with a water level and generate a first data packet thereof; and a computing device configured to: enable, from received the first data packet, determination of water level at the borewell. The device also includes: a flow sensor coupled with an outlet pipe of the borewell, the flow sensor configured to generate a second data packet pertaining to flow of water in the outlet pipe. The computing device is configured to, upon receipt of the second data packet, enable determination of water consumption at the borewell.

8 Claims, 2 Drawing Sheets

DEVICE AND SYSTEM FOR DETERMINING WATER LEVEL AND ASSESSING WATER CONSUMPTION AT A BOREWELL

TECHNICAL FIELD

The present disclosure relates generally to assessment of performance of a borewell. In particular, the present disclosure relates to a means to determine water level and assess consumption of water at a borewell.

BACKGROUND

Background description includes information that may be useful in understanding the present invention. It is not an admission that any of the information provided herein is prior art or relevant to the presently claimed invention, or that any publication specifically or implicitly referenced is prior art.

Water level is a proxy indicator of water quantity available in borewells/boreholes and monitoring its fluctuations can guide the borewell owner on its performance and undertaking appropriate measures for regulating abstractions and recharge, thus helping to enhance the life of the borewell and delaying early drying up of them. Measurement of ground water levels especially in borewells is an important action to track the performance and sustainable usage of borewells/boreholes from water resource management point of view. Flow measurement is essential to understand the quantity of water abstracted over a period of time and this is particularly relevant in areas where regulations on abstractions are intended either by the government or the owner of the well.

Conventional means to determine water levels at borewell sites using a measuring tape or a high-end equipment such as a piezometer or a sonar meter. Measurements with a measuring tape or a string is a cumbersome method which requires removal of top assembly of borewell/borehole to allow dropping of a tape or a string. The method poses constraints in frequent measurements as it requires laborious efforts for every measurement.

Use of a piezometer or a sonar meter is an expensive proposition and is not affordable to all and, as such, these methods are not scalable. Further, the reliability, especially of sonar equipment, to provide accurate results can be significantly constrained due to issues of incorrect vertical alignment of borewell, presence of delivery pipes/cables/uncased well surfaces, clogging of wells, submersible pumps etc., which hinder the undisturbed path required for sonar rays to hit the water surface below. As a result, the accuracy of sonar equipment may not always be reliable. These methods also pose limitations in data transfers to cloud and finally to users and not designed for any data analytics.

Flow measurements are currently done using various types of technologies. Ultrasonic, electromagnetic and mechanical meters are used to measure the flow and it requires special meters to be brought on to the site to measure the flows. All these methods pose limitations with regard to the ease of use and frequency of use, affordability, reliability, digitization and scalability.

There is, therefore, a requirement in the art for a means to accurately determine water level and water consumption at a borewell site to monitor health of ground water. Further, it is preferable to have a means that is economical, easily implementable and scalable.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

OBJECTS OF THE INVENTION

A general object of the present invention is to provide a device for determining water level and assessing water consumption at a borewell.

Another object of the present invention is to provide a device that can be installed outside the borewell.

Another object of the present invention is to provide a device that can be operated remotely.

Another object of the present invention is to provide a device that can provide accurate water level and water consumption despite structural inconsistencies and imperfections of the borewell.

Another object of the present invention is to provide a device that is economical and scalable.

Another object of the present invention is to provide a system for determining water level and assessing water consumption at a borewell.

SUMMARY

The present disclosure relates generally to assessment of performance of a borewell. In particular, the present disclosure relates to a means to determine water level and assess consumption of water at a borewell.

In an aspect, the present disclosure provides a device for determining water level and assessing water consumption at a borewell. The device includes: a tapping mechanism coupled to a top metal cover of the borewell, the tapping mechanism configured to, on actuation, impact on the metal cover of the borewell to generate a first sound wave that travels through a cavity of the borewell; a sound detector coupled to the top metal cover of the borewell, the sound detector configured to detect a second sound wave associated with reflection of at least a part of the first sound wave with a body of water, wherein, upon detection of the second sound wave, the sound detector is configured to generate a first data packet pertaining to the impact on the casing of the borewell; and a computing device configured to receive the first data packet, the computing device comprising a processor operatively coupled with a memory, the memory storing instructions executable by the processor to: enable, from received the first data packet, determination of at least one water level parameter of the body of water.

In an embodiment, the at least one water level parameter can be a depth of a level of water in the borewell with respect to the metal cover of the borewell.

In another embodiment, the first data packet can include data selected from location of the tapping mechanism, location of the sound detector, time stamp of the impact on the metal cover of the borewell and time stamp of detection of the second sound wave by the sound detector.

In another embodiment, the device can include: a flow sensor coupled with an outlet pipe of the borewell, the outlet pipe adapted for flow of water from the borewell. The flow sensor can be configured to generate a second data packet pertaining to flow of water in the outlet pipe, and the computing device can be configured to receive the second data packet and upon receipt of the second data packet, enable determination of at least one water flow parameter of the water flowing in the outlet pipe.

In another embodiment, the at least one water flow parameter can be a volumetric flow rate of the water flowing in the outlet pipe. In another embodiment, the second data packet can include data selected from velocity of water flowing in the outlet pipe and area of cross-section of the outlet pipe.

In another embodiment, the device can be provided with a screen configured to display the at least one water level parameter and the at least one water flow parameter.

In another embodiment, the device can include a transmitter to transmit the first data packet and the second data packet to the computing device, and wherein the computing device is any or a combination of a remotely located server and a cloud.

In another embodiment, the computing device can be any of one or more mobile devices, and wherein the one or more mobile devices are each enabled with an application to operate the computing device.

In another embodiment, the device can be powered by any or a combination of a battery pack and an external power source.

In an aspect, the present disclosure provides a system for determining water level and assessing water consumption at a borewell. The system includes a device, which includes: a tapping mechanism coupled to a top metal cover of the borewell, the tapping mechanism configured to, on actuation, impact on the metal cover of the borewell to generate a first sound wave that travels through a cavity of the borewell; and a sound detector coupled to the top metal cover of the borewell, the sound detector configured to detect a second sound wave associated with reflection of at least a part of the first sound wave with a body of water, wherein, upon detection of the second sound wave, the sound detector is configured to generate a first data packet pertaining to the impact on the casing of the borewell. The system includes a computing device configured to receive the first data packet, the computing device comprising a processor operatively coupled with a memory, the memory storing instructions executable by the processor to: enable, from received the first data packet, determination of at least one water level parameter of the body of water.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present invention and are incorporated in and constitute a part of this specification. The drawings illustrate exemplary embodiments of the present invention and, together with the description, serve to explain the principles of the present invention.

DETAILED DESCRIPTION

Figure 1:
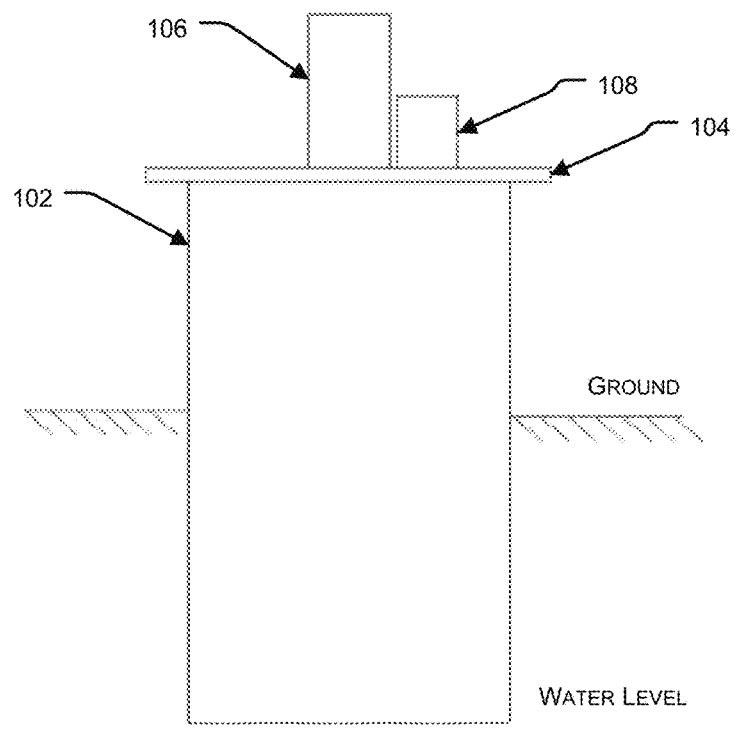
FIG. 1 illustrates an exemplary representation of a set-up with a borewell and a proposed device for determining water level and assessing water consumption at the borewell, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Embodiments described herein relate generally to assessment of a borewell, and in particular, to a means to assess consumption of water at a borewell. The present disclosure provides a device for determining water level and assessing water consumption at a borewell by determining volumetric flow rate of water extracted from the borewell. The device provided is economical and can be operated remotely. The device can be installed outside the borewell, thereby excluding a necessity to gain access into a casing of the borewell to determine the depth of the water level. Further, the device, due to its use of sound waves propagating through a cavity of the borewell, provides an accurate reading even when the borewell is not properly aligned, or the borewell is fitted with submersible pumps.

The present disclosure relates generally to assessment of performance of a borewell. In particular, the present disclosure relates to a means to determine water level and assess consumption of water at a borewell.

In an aspect, the present disclosure provides a device for determining water level and assessing water consumption at a borewell. The device includes: a tapping mechanism coupled to a top metal cover of the borewell, the tapping mechanism configured to, on actuation, impact on the metal cover of the borewell to generate a first sound wave that travels through a cavity of the borewell; a sound detector coupled to the top metal cover of the borewell, the sound detector configured to detect a second sound wave associated with reflection of at least a part of the first sound wave with a body of water, wherein, upon detection of the second sound wave, the sound detector is configured to generate a first data packet pertaining to the impact on the casing of the borewell; and a computing device configured to receive the first data packet, the computing device comprising a processor operatively coupled with a memory, the memory storing instructions executable by the processor to: enable, from received the first data packet, determination of at least one water level parameter of the body of water.

In another embodiment, the device can include: a flow sensor coupled with an outlet pipe of the borewell, the outlet pipe adapted for flow of water from the borewell. The flow sensor can be configured to generate a second data packet pertaining to flow of water in the outlet pipe, and the computing device can be configured to receive the second data packet and upon receipt of the second data packet, enable determination of at least one water flow parameter of the water flowing in the outlet pipe.

In an aspect, the present disclosure provides a system for determining water level and assessing water consumption at a borewell. The system includes a device, which includes: a tapping mechanism coupled to a top metal cover of the borewell, the tapping mechanism configured to, on actuation, impact on the metal cover of the borewell to generate a first sound wave that travels through a cavity of the borewell; and a sound detector coupled to the top metal cover of the borewell, the sound detector configured to detect a second sound wave associated with reflection of at least a part of the first sound wave with a body of water, wherein, upon detection of the second sound wave, the sound detector is configured to generate a first data packet pertaining to the impact on the casing of the borewell. The system includes a computing device configured to receive the first data packet, the computing device comprising a processor operatively coupled with a memory, the memory storing instructions executable by the processor to: enable, from received the first data packet, determination of at least one water level parameter of the body of water.

FIG. 1 illustrates an exemplary representation of a set-up with a borewell and a proposed device for determining water level and assessing water consumption at the borewell, in accordance with an embodiment of the present disclosure. The set-up illustrates a borewell 102. The borewell 102 typically extends underground and up to a ground water level, often submerged under a water level. The borewell 102, on a top side, extends above the ground.

Typically, the borewell 102, at a top portion, is provided with a borewell cover 104. The borewell cover 104 is a plate like structure adapted to cover an opening of the borewell casing 102 above ground, and can be made of a metal or non-metal, which is strong, rigid and durable such as, without limitations, metal, concrete, mortar, stone, metal reinforced concrete and a combination thereof. The borewell cover 104 is generally secured to the opening of the borewell 102 using securing means such as fasteners or using means such as welding. The borewell cover 104 serves to prevent dust and debris from entering the borewell 102, which can potentially cause a blockage to the flow of water.

The borewell cover 104 of the present disclosure is preferably made of a material that is suitable for transmission of sound waves, such as a metal.

The borewell 102, typically, is coupled with a pump (not shown in figure), which serves to pump water up from the water level, through the borewell 102 and towards the borewell cover 104. An outlet pipe 106 of the borewell 102 can be coupled at the borewell cover 104 or to any other part of the borewell 102 through which the water pumped up from the water level exits the borewell 102.

In an embodiment, the proposed device 108 for determining water level and assessing water consumption at the borewell (hereinafter, also referred to as "device 108") can be placed on the borewell cover 104, and near the outlet pipe 106.

In another embodiment, the device 108 can contain components adapted for determining depth of water level from the ground level using a principle of sonic reflection.

In another embodiment, the device 108 can contain components adapted to determine volumetric flow of water from the outlet pipe 106 using a calibrated volumetric flow sensor.

In another embodiment, the device 108 can be a multi-function device adapted for determining depth of water level from the ground level as well as for determining volumetric flow of water from the outlet pipe 106. The device 108, in an instance of the present embodiment, is placed atop the borewell cover 104 such that the device 108 can generate sound waves on the borewell cover 104, and the device 108 can access water flowing through the outlet pipe 106.

Figure 2:
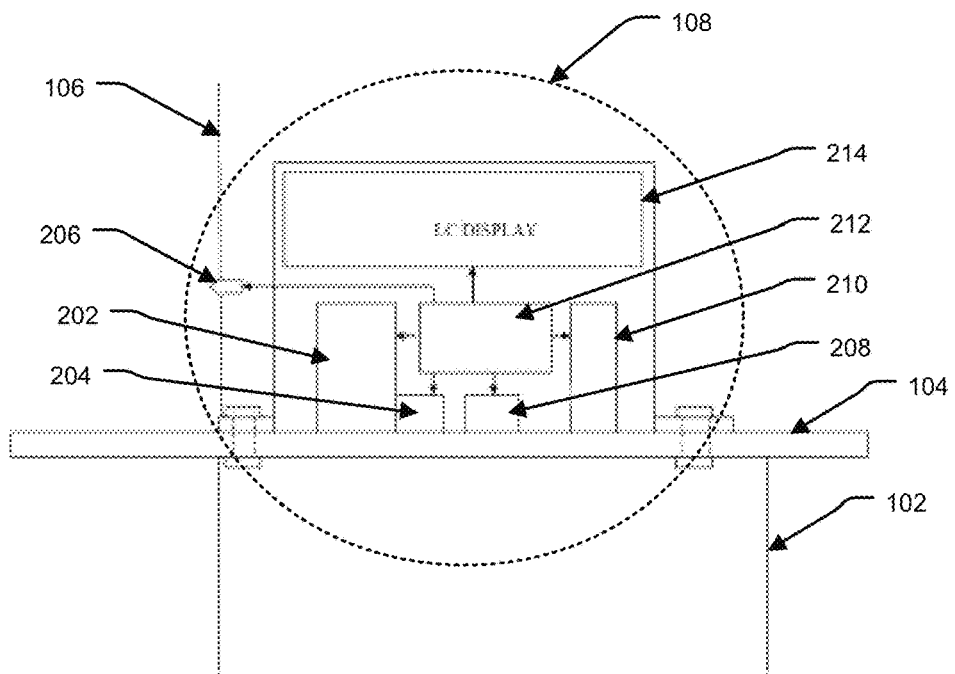
FIG. 2 illustrates an exemplary representation of the proposed device for determining water level and assessing water consumption at the borewell, in accordance with an embodiment of the present disclosure.

FIG. 2 illustrates an exemplary representation of the proposed device for determining water level and assessing water consumption at the borewell, in accordance with an embodiment of the present disclosure. In an embodiment, the device 108 can include: a tapping mechanism 202; and a microphone 204. The tapping mechanism 202 (hereinafter, also referred to as "tapper 202") can include a solenoid coupled with a tapper 202. When the solenoid is actuated, the tapper 202 is made to impact the borewell cover 104. The solenoid can be configured to activate and de-activate in quick succession to create a staccato of impacts on the borewell cover 104 by the tapper 202. The frequency of impacts can be configured as desired.

Typically, since the borewell cover 104 is secured firmly on the borewell casing 102, sound waves from the tapper 202 on the borewell cover 104 can travel through a cavity of the borewell 102 downwards till it reaches the water level. At the water level, at least a part of the sound waves are reflected back through the cavity of the borewell 102 towards the borewell cover 104.

In an embodiment, a microphone 204 is coupled to the device 108 and is provided on the borewell cover 104. The microphone 204 is adapted to sense and receive reflected sound waves (or, echoes) from the water surface and generate an associated sound signal thereof.

In another embodiment, the device 108 is provided with a processor 208 that is adapted to receive the generated sound signal from the microphone 204. The processor 208 is operatively coupled with a computing device (not shown in figure). It can be appreciated that the computing device can be a remote device such as a server or a cloud or can be part of the processor 208.

In an exemplary embodiment, when the computing device is located remotely, the device 108 can be provided with a transmitter 210 adapted to transmit data to the remotely located computing device. In an exemplary embodiment, the transmitter 210 can be a GSM unit configured to access a mobile network. It can be appreciated that the transmitter 210 can also be any other wireless or wired means of communications which can form a stable bi-directional connectivity between the device 108 and the computing device.

In another embodiment, the computing device can be configured with a set of instructions to determine, from a received generated sound signal, the depth of water level from the ground level. The depth can be determined as a function of the speed of sound waves through the cavity of the borewell 102 and time duration between an impact on the borewell cover 104 by the tapper 202 and reception by the microphone 204 of the corresponding reflected sound wave (or, echo).

In another embodiment, the device 108 can be provided with an output unit 214 such as a screen, on which information pertaining to determined depth of the water level can be displayed.

In another embodiment, the device 108 can be provided with a power unit 212 adapted to provide power to the components of the device 108. The power unit 212 can be any or a combination of a battery power or an external source.

In another embodiment, the device 108 of the present disclosure is a multi-function device adapted for determining depth of water level from the ground level as well as for determining volumetric flow of water from the outlet pipe 106, and is placed atop the borewell cover 104 such that the device 108 can generate sound waves on the borewell cover 104, and the device 108 can access water flowing through the outlet pipe 106.

Typically, the outlet pipe of the borewell has a uniform cross-section. Hence, measuring velocity of water flow through the outlet pipe for a specific cross-section of the outlet pipe can help determine the volumetric flow of the water through the outlet pipe. In some cases, the outlet pipe can be provided with a notch to ensure that water flowing out of the outlet pipe has a constant cross-section.

In another embodiment, the device 108 can include a flow sensor 206. In an exemplary embodiment, the flow sensor can be a paddle wheel sensor. The flow sensor 206 is placed such that it is in contact with the water flowing through the outlet pipe 106, where the flowing water in the outlet pipe 106 actuates the paddle wheel of the flow sensor 206, which causes the flow sensor 206 to generate a flow signal.

In another embodiment, the computing device can be configured with a set of instructions to determine, from a received generated flow signal, the volumetric flow rate of water through the outlet pipe 106 of the borewell. The volumetric flow rate can be determined as a function of diameter of the paddle wheel of the flow sensor 206, the rate of rotation of the paddle wheel and cross-section of the outlet pipe 106.

In another embodiment, information pertaining to determined volumetric flow rate of water through the outlet pipe 106 can be displayed on the output unit 214.

From the determined depth of water level and volumetric flow, the computing device can be configured to generate a report of performance of the borewell and this data can facilitate monitoring and regulation of water consumption at the borewell. The data can also be used to plan measures for recharge of the ground water at the borewell and study the impact of recharge measures on the ground water at the borewell.

In another embodiment, instructions to activate the tapper 202 and the flow sensor 206 can be provided remotely. The instructions can be provided manually by a user or can be issued automatically as per any desired set parameters. The instructions can be issued through a mobile device such as a mobile phone, laptop, tablet etc., through a dedicated or compatible application installed on the mobile device. In such an instance, the device 108 can be provided with a transceiver that can receive the issued instruction. The processor 208 of the device 108 can operate the components of the device 108 as instructed.

In another embodiment, the device 108 can be provided with a cover to shield it against natural elements such as dust and water. The device 108 can also be provided with a housing that is adapted for protection against physical shocks.

In another embodiment, the device 108 can be provisioned with suitable attachments to facilitate attachment of the device 108 to any or a combination of the borewell cover 104, the borewell casing 102 and the outlet pipe 106.

Figure 3:
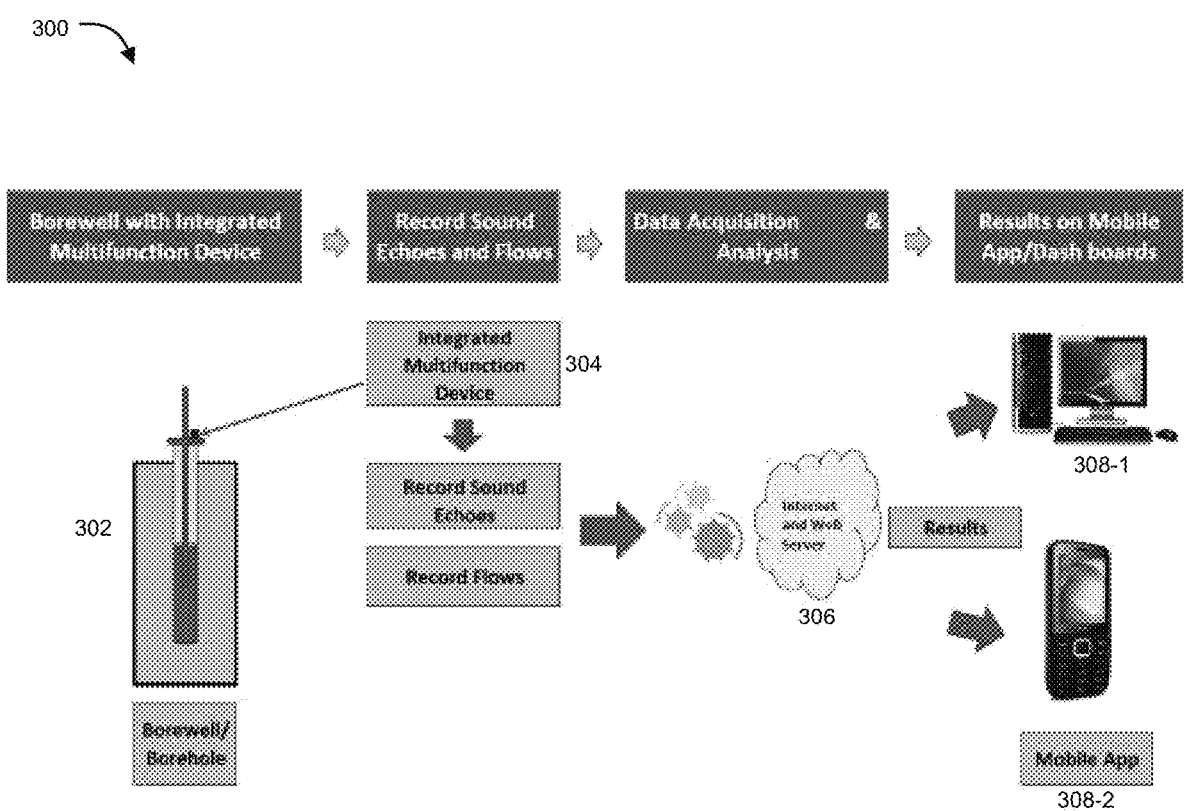
FIG. 3 illustrates an exemplary functional block diagram for a system for determining water level and assessing water consumption at the borewell, in accordance with an embodiment of the present disclosure.

FIG. 3 illustrates an exemplary functional block diagram for a system for determining water level and assessing water consumption at the borewell, in accordance with an embodiment of the present disclosure. The system 300 includes a borewell 302 whose water consumption is to be assessed. The device 304 is installed on a cover of the borewell 302. The device 304 can be a multi-function device adapted for determining depth of water level from the ground level as well as for determining volumetric flow of water from an outlet pipe of the borewell 302. The device 304, in an instance of the present embodiment, is placed atop the borewell cover such that it is also able to access water flowing through the outlet pipe. The device 304, upon actuation, is configured to:
    record reflected sound and water velocity;
    transmit data to a cloud computing device 306 for analysis and determination of water level and volumetric flow; and
    display data pertaining to water level and volumetric flow on a mobile device (308-1, 308-2).

Thus, the present disclosure provides a device and a system that can provide data pertaining to a current depth of water level in a borewell and a current consumption of water at the borewell. This data can facilitate monitoring and regulation of water consumption at the borewell and can also be used to plan measures for recharge of the ground water at the borewell and study the impact of recharge measures on the ground water at the borewell.

It should be apparent to those skilled in the art that many more modifications besides those already described are possible without departing from the inventive concepts herein. The inventive patent matter, therefore, is not to be restricted except in the spirit of the appended claims. Moreover, in interpreting both the specification and the claims, all terms should be interpreted in the broadest possible manner consistent with the context. In particular, the terms "includes" and "including" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practised with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present invention provides a device for determining water level and assessing water consumption at a borewell.

The present invention provides a device that can be installed outside the borewell.

The present invention provides a device that can be operated remotely.

The present invention provides a device that can provide accurate water level and water consumption despite structural inconsistencies and imperfections of the borewell.

The present invention provides a device that is economical and scalable.

The present invention provides a system for determining water level and assessing water consumption at a borewell.

I claim:

1. A device for determining water level and assessing water consumption at a borewell, said device comprising:
    a tapping mechanism coupled to a top metal cover of the borewell, said tapping mechanism configured to, on actuation, impact on the metal cover of the borewell to generate
    a first sound wave that travels through a cavity of the borewell;
    a sound detector coupled to the top metal cover of the borewell, said sound detector configured to detect a second sound wave associated with reflection of at least a part of the first sound wave with a body of water, wherein, upon detection of the second sound wave, the sound detector is configured to generate a first data packet pertaining to the impact on the casing of the borewell;
    a computing device configured to receive the first data packet, said computing device comprising a processor operatively coupled with a memory, said memory storing instructions executable by the processor to: enable, from received the first data packet, determination of at least one water level parameter of the body of water; and
    a flow sensor coupled with an outlet pipe of the borewell, said outlet pipe adapted for flow of water from the borewell, wherein the flow sensor is configured to generate a second data packet pertaining to flow of water in the outlet pipe, and wherein the computing device is configured to receive the second data packet and, upon receipt of the second data packet, enable determination of at least one water flow parameter of the water flowing in the outlet pipe.

2. The device as claimed in claim 1, wherein the at least one water level parameter is a depth of a level of water in the borewell with respect to the top metal cover of the borewell.

3. The device as claimed in claim 1, wherein the first data packet comprises data selected from location of the tapping mechanism, location of the sound detector, time stamp of the impact on the metal cover of the borewell and time stamp of detection of the second sound wave by the sound detector.

4. The device as claimed in claim 1, wherein the at least one water flow parameter is a volumetric flow rate of the water flowing in the outlet pipe.

5. The device as claimed in claim 1, wherein the second data packet comprises data selected from velocity of water flowing in the outlet pipe and area of cross-section of the outlet pipe.

6. The device as claimed in claim 1, wherein the device is provided with a screen configured to display the at least one water level parameter and the at least one water flow parameter.

7. The device as claimed in claim 1, wherein the device comprises a transmitter to transmit the first data packet and the second data packet to the computing device, and wherein the computing device is any or a combination of a remotely located server and a cloud.

8. The device as claimed in claim 1, wherein the computing device is any of one or more mobile devices, and wherein the one or more mobile devices are each enabled with an application to operate the computing device.

* * * * *